(12) United States Patent
Watanabe et al.

(10) Patent No.: US 7,154,713 B2
(45) Date of Patent: Dec. 26, 2006

(54) CPP-TYPE MAGNETIC HEAD WITH LESS DEFORMATION AND A MAGNETIC RECORDING/REPRODUCING SYSTEM USING THE SAME

(75) Inventors: Katsuro Watanabe, Odawara (JP); Kikuo Kusukawa, Yoshikawa (JP); Taku Shintani, Odawara (JP); Kenichi Meguro, Matsuda (JP)

(73) Assignee: Hitachi Global Storage Technologies Japan, Ltd., Kanagawa-ken (JP)

( * ) Notice: Subject to any disclaimer, the term of this patent is extended or adjusted under 35 U.S.C. 154(b) by 0 days.

(21) Appl. No.: 11/322,262

(22) Filed: Jan. 3, 2006

(65) Prior Publication Data

US 2006/0109592 A1  May 25, 2006

Related U.S. Application Data

(63) Continuation of application No. 10/369,682, filed on Feb. 21, 2003, now Pat. No. 7,031,119.

(30) Foreign Application Priority Data

Aug. 30, 2002  (JP) .............................. 2002-252348
Jan. 8, 2003  (JP) .............................. 2003-001669

(51) Int. Cl.
  *G11B 5/39* (2006.01)
(52) U.S. Cl. .................. 360/313; 360/319; 360/320; 360/324.2
(58) Field of Classification Search .................. None
See application file for complete search history.

(56) References Cited

U.S. PATENT DOCUMENTS

| 5,930,087 | A * | 7/1999 | Brug et al. ............... 360/324.2 |
| 6,759,081 | B1 | 7/2004 | Huganen et al. |
| 6,765,768 | B1 | 7/2004 | Saito |
| 6,801,408 | B1 * | 10/2004 | Chen et al. ................. 360/319 |
| 6,826,022 | B1 | 11/2004 | Umetsu |
| 6,842,969 | B1 | 1/2005 | Dovek et al. |

FOREIGN PATENT DOCUMENTS

| JP | 11-175920 | 12/1997 |
| JP | 11-175927 | 12/1997 |
| JP | 2000-215415 | 1/1999 |
| JP | 2001-28108 | 9/1999 |
| JP | 2002-133614 | 10/2000 |

OTHER PUBLICATIONS

T. Miyazaki and N, Tezuka, "Giant Magnetic Tunneling Effect in Fe/Al$_2$O$_3$/Fe Junction", Journal of Magnetism and Magnetic Materials, 139 (1995), pp. L231-L234.

(Continued)

*Primary Examiner*—A. J. Heinz
(74) *Attorney, Agent, or Firm*—Reed Smith LLP; Stanley P. Fisher, Esq.; Juan Carlos A. Marquez, Esq.

(57) ABSTRACT

A high output, magnetoresistive head with a CPP structure is disclosed which reduces or prevents deformation near the air bearing surface of the read element portion layer at the time of air bearing surface processing. In the CPP structure magnetoresistive head, the deformation near the air bearing surface as a result of mechanical polishing during the air bearing surface processing can be reduced by forming deformation prevention layers having a higher shear modulus than the first ferromagnetic layer, and a second ferromagnetic layer between a magnetoresistive film and at least one of a lower shield layer and an upper shield layer.

16 Claims, 8 Drawing Sheets

OTHER PUBLICATIONS

K. Nagasaka, Y. Seyama, L. Varga, Y. Shimizu and A. Tanaka, "Giant Magnetroresistance Properties of Specular Spin Valve Films in a Current Perpendicular to Plane Structure", Journal of Applied Physics, vol. 89, No. 11, (Jun. 1, 2001), pp. 6943-6945.

* cited by examiner

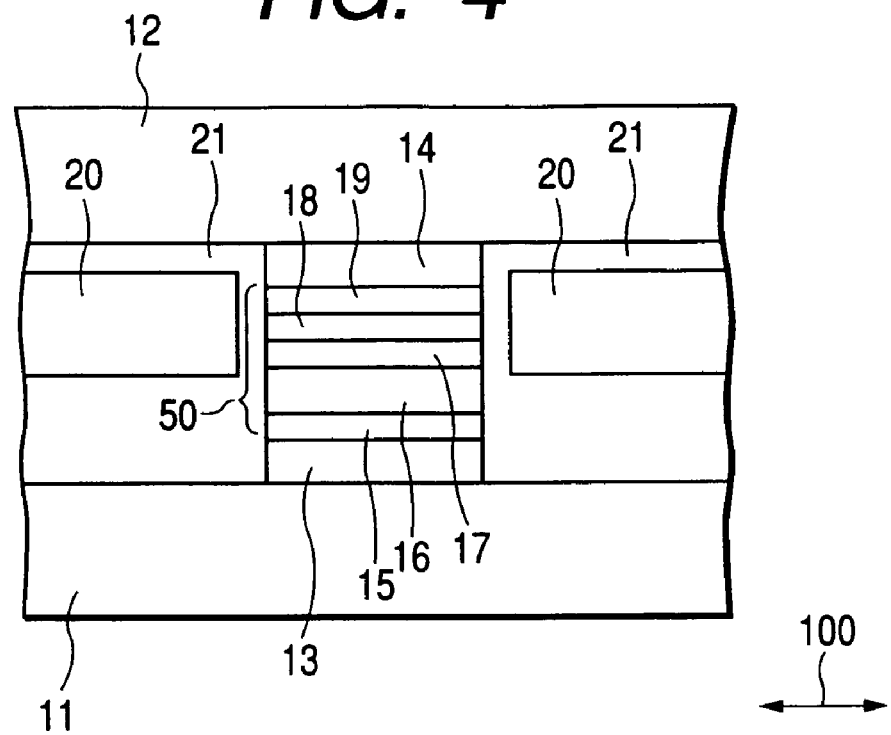
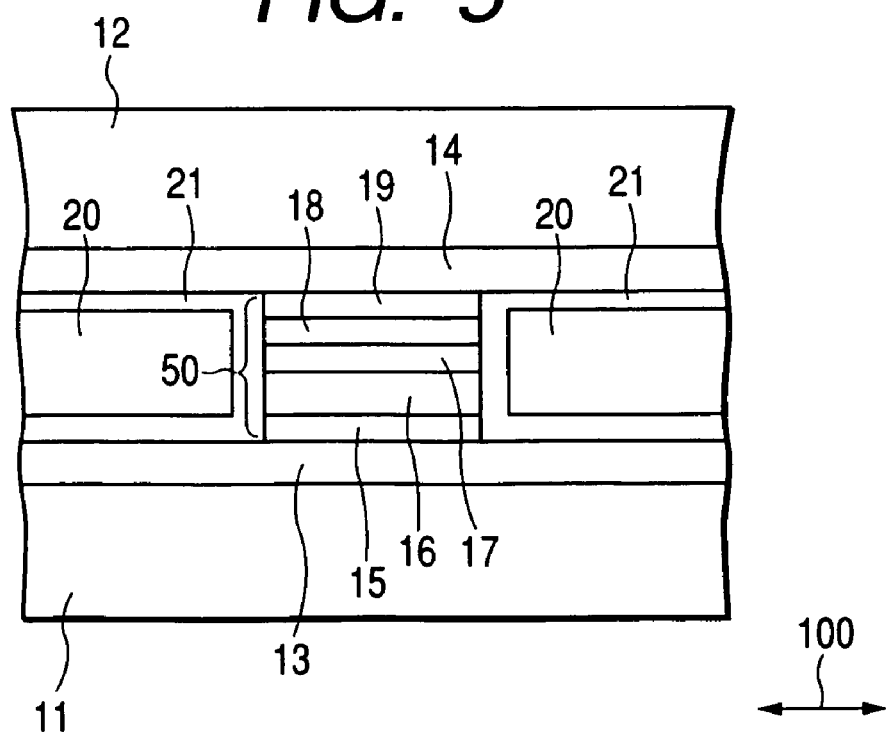

ary layers above and below the barrier layer of a TMR film are
CPP-TYPE MAGNETIC HEAD WITH LESS DEFORMATION AND A MAGNETIC RECORDING/REPRODUCING SYSTEM USING THE SAME

CROSS-REFERENCE TO RELATED APPLICATION

This application is a Continuation of U.S. application Ser. No. 10/369,682 filed on Feb. 21, 2003 now U.S. Pat. No. 7,031,119, and claims priority from U.S. application Ser. No. 10/369,682 filed on Feb. 21, 2003, which claims priority from Japanese Patent Application Nos. 2002-252348 and 2003-001669, filed on Aug. 30, 2002 and Jan. 3, 2003, respectively, the entire disclosures of which are incorporated herein by reference.

BACKGROUND OF THE INVENTION

1. Field of the Invention

The present invention relates to a magnetic head having a CPP (Current Perpendicular to the Plane) structure in which a sensing current is applied in a direction substantially perpendicular to the interface between the first ferromagnetic layer and the intermediate layer of a magnetoresistive film and the interface between the intermediate layer and the second ferromagnetic layer of the film and to a magnetic recording/reproducing system having the magnetic head.

2. Description of the Related Art

Surprisingly, the recording density of a magnetic recording/reproducing system has been increasing at an annual rate of 100%. Along with this, a magnetic head mounted to a magnetic recording/reproducing system is required to have higher output and a narrower shield to shield distance.

To achieve higher output, attempts have been made to improve the performance of a magnetoresistive film. An anisotropic magnetoresistive (AMR) film has been used to achieve a recording density up to several Gb/in$^2$ but a giant magnetoresistive (GMR) film capable of obtaining high output is now used to achieve a recording density higher than the above value.

Further, a tunnel magnetoresistive (TMR) film as disclosed in Journal of Magnetism and Magnetic Materials, vol. 139, pp. L231 to L234 published in 1995 and a CPP (Current Perpendicular to the Plane)-GMR film in which a current is applied in a direction perpendicular to the plane of a GMR film as disclosed in Journal of Applied Physics, vol. 89, pp. 6943 to 6945 published in 2001 are under research and development as next-generation magnetoresistive films after the GMR film.

To achieve a narrower shield to shield distance, in the case of a so-called CIP (Current Into the Plane) GMR film in which a sensing current is applied to the plane of a magnetoresistive film, as the thickness of an insulating gap layer interposed between shield layers and the GMR film and between shield layers and electrode films for supplying a sensing current to the GMR film become small and a sensing current leaks out into the shield layer, when the shield to shield distance is set to about 80 nm or less, the yield greatly lowers, and it is technically difficult to reduce the shield to shield distance to 70 nm or less. Since an insulating gap film as seen in a CIP structure becomes unnecessary in a CPP structure in which a sensing current is applied in a direction perpendicular to the plane of the magnetoresistive film, it can be said that the CPP structure is advantageous in reducing the shield to shield distance.

Since the CPP structure is a new structure unlike the CIP structure whose technology is becoming mature, it still has some problems to be solved. One of the problems is a air bearing surface processing technology. As for a magnetic head comprising a TMR film as a magnetoresistive film having a CPP structure, JP-A 11-175927 discloses a method employing a plasma process for air bearing surface processing, and JP-A 2001-28108 discloses a technology for carrying out air bearing surface processing after ferromagnetic layers below and above the barrier layer of a TMR film are short-circuited. JP-A 11-175920 and JP-A 2000-215415 disclose a layer underlying the ferromagnetic film or anti-ferromagnetic film of a TMR film and the material of a lower electrode layer.

In order to improve the yield of air bearing surface processing, JP-A 2002-133614 discloses a GMR head having a double shield layer structure consisting of an inner layer and an outer layer formed in the order named from a magnetoresistive film, the inner layer having higher hardness than the outer layer.

The above prior arts disclose air bearing surface processing technologies when the magnetoresistive film is a TMR film. JP-A 11-175927 aimed to improve deteriorated magnetoresistive properties caused by a damaged layer by processing formed by air bearing surface processing, particularly a damaged layer by processing for a barrier layer, and JP-A 2001-28108 aimed to reduce a damage in the wafer process and air bearing surface process.

However, the step of obtaining a desired sensor height using the plasma process disclosed by JP-A 11-175927 in air bearing surface processing has a poor throughput, is not practical and needs mechanical polishing. Even in the structure for short-circuiting the ferromagnetic layers above and below the barrier layer disclosed by JP-A 2001-28108, a short-circuit can be maintained in the rough process before a predetermined sensor height is obtained but a short-circuited portion is removed in the precision process in which a predetermined sensor height is obtained.

JP-A 11-175920 names 23 metals including Ti, V and Cu for use in the underlayer of the ferromagnetic film or anti-ferromagnetic film, and JP-A 2000-215415 names 12 metals including Ta, Zr and Au as materials for the lower electrode layer. Since soft and deformable materials such as Cu and Au are selected, it can be assumed that a damage by mechanical polishing at the time of air bearing surface processing is not taken into account.

JP-A 2002-133614 includes a description of a shield layer structure which is hardly deformed for a CIP structure GMR head. Since a GMR film which is a magnetoresistive film is sandwiched between insulating gap layers made from a material which is hardly deformed such as alumina in the case of a GMR head, the deformation of the GMR film itself hardly occurs. Therefore, the main cause of deteriorating properties during air bearing surface processing is the shield layer. More specifically, when a air bearing surface is to be polished, a metal constituting the shield layer is dragged from the insulating gap film to the GMR film, thereby causing a phenomenon that a sensing current leaks out from the GMR film into the shield layer to greatly reduce output. This problem can be solved by making only the shield layer from a material having high hardness.

However, as the magnetoresistive film, the gap layer and the shield layer are made from a metal in the CPP structure head, all of them are readily deformed, whereby the dragging of a metal constituting the shield layer which occurs in the CIP structure head occurs, and also the deterioration of characteristics is caused by the deformation of the gap layer and the deformation of the magnetoresistive film (disorder and fault of the laminate structure). Therefore, in the case of the CPP structure head, taking the mechanical properties of only the shield layer into consideration is unsatisfactory, and it is important that the magnetoresistive film, the gap layer and the shield layer should be entirely made difficult to be deformed. Since shearing stress is applied at the time of air bearing surface processing, the mechanical property that must be taken into consideration is shear modulus. The shear modulus of a material disclosed by JP-A 2002-133614 is 7.1 to $8.3 \times 10^{10}$ Pa according to calculation by the inventor of the present invention.

SUMMARY OF THE INVENTION

It is an object of the present invention to provide a magnetoresistive head having a CPP structure which comprises a CPP magnetoresistive film such as a TMR film or CPP-GMR film at a high yield, wherein the magnetoresistive head is little damaged by mechanical polishing and has high output when air bearing surface processing for achieving a predetermined sensor height is carried out by mechanical processing.

It is another object of the present invention to provide a magnetic recording/reproducing system having high linear recording density and high a real recording density and incorporating a magnetoresistive head having a CPP structure suitable for a narrow read gap and capable of obtaining high output.

According to one aspect of the present invention, there is provided a magnetic head comprising a lower shield layer, an upper shield layer, a magnetoresistive film formed between the upper shield layer and the lower shield layer and comprising at least a first ferromagnetic layer, intermediate layer and second ferromagnetic layer, a lower gap layer formed between the lower shield layer and the magnetoresistive film, and an upper gap layer formed between the upper shield layer and the magnetoresistive film, and having detection means for detecting a resistance change produced from the magnetoresistive film by a variation in external magnetic field when a sensing current is applied in a direction substantially perpendicular to the interface between the first ferromagnetic layer and the intermediate layer and the interface between the intermediate layer and the second ferromagnetic layer, wherein a deformation prevention layer having a higher shear modulus than the first ferromagnetic layer and the second ferromagnetic layer is formed between the magnetoresistive film and at least one of the upper shield layer and the lower shield layer.

At least one of the upper shield layer and the lower shield layer is a laminate consisting of three or more layers including a second deformation prevention layer and a soft magnetic layer.

The deformation prevention layer and the second deformation prevention layer is made from a metal selected from the group consisting of Mo, Rh, W and Ir or an alloy containing at least one element selected from the above group. Or the deformation prevention layer and the second deformation prevention layer may be made from a material containing at least one element selected from the group consisting of Mo, Rh, W and Ir and at least one element selected from the group consisting of B, C and N.

BRIEF DESCRIPTION OF THE DRAWINGS

FIG. 4 is a diagram showing the structure of the air bearing surface of another magnetoresistive head having a CPP structure according to Embodiment 1 of the present invention;

FIG. 5 is a diagram showing the structure of the air bearing surface of a magnetoresistive head having a CPP structure according to Embodiment 2 of the present invention;

DETAILED DESCRIPTION OF THE PREFERRED EMBODIMENTS

Figure 1:
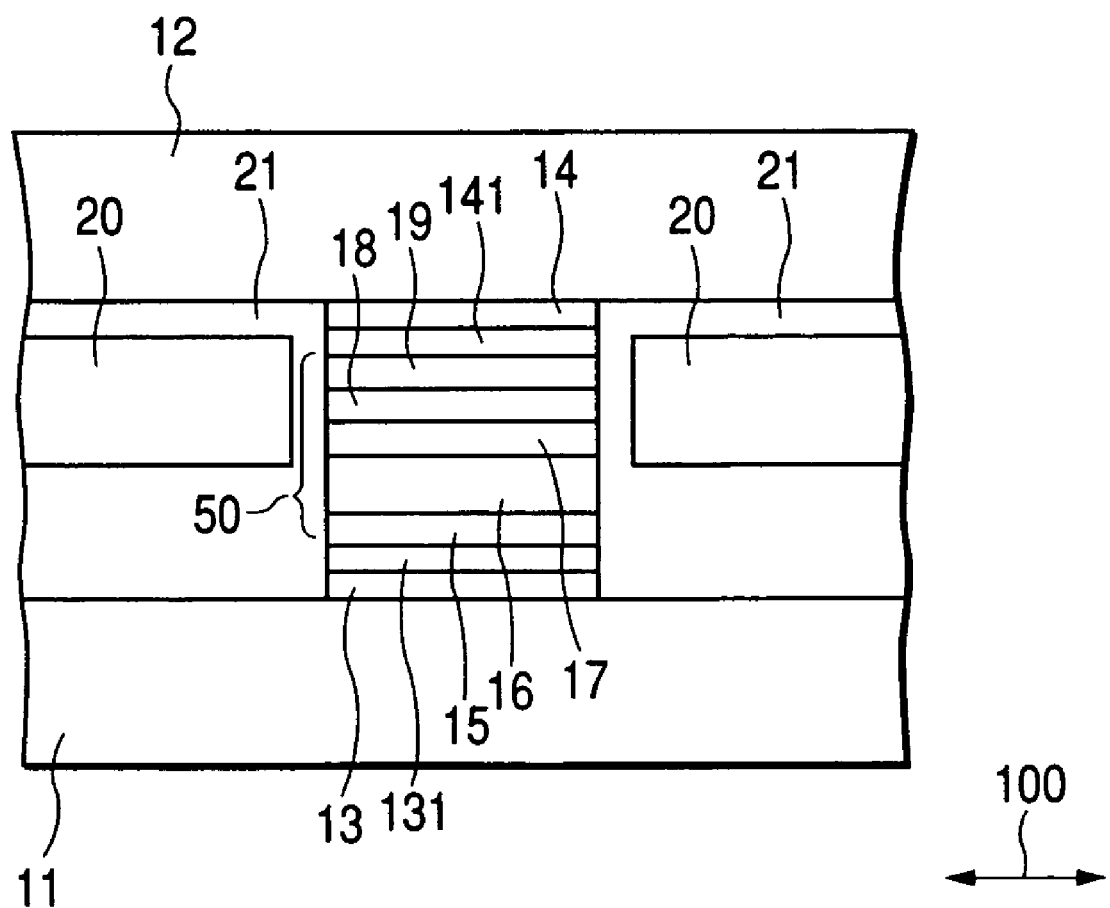
FIG. 1 is a diagram showing the structure of the air bearing surface of a magnetoresistive head having a CPP structure according to an embodiment of the present invention.

The magnetic head and the magnetic recording/reproducing system according to the present invention will be described in detail hereinunder.

This magnetic head comprises a lower shield layer, an upper shield layer, a magnetoresistive film which is formed between the above upper shield layer and the above lower shield layer and comprises at least a first ferromagnetic layer, intermediate layer and second ferromagnetic layer, a lower gap layer formed between the lower shield layer and the magnetoresistive film, and an upper gap layer formed between the upper shield layer and the magnetoresistive film, and has detection means for detecting a resistance change produced from the magnetoresistive film by a variation in external magnetic field when a sensing current is applied in a direction substantially perpendicular to the interface between the first ferromagnetic layer and the intermediate layer and the interface between the intermediate layer and the second ferromagnetic layer.

A deformation prevention layer having a higher shear modulus than the first ferromagnetic layer and the second ferromagnetic layer is formed between the above magnetoresistive film and at least one of the upper shield layer and the lower shield layer.

Alternatively, at least one of the upper shield layer and the lower shield layer is a laminate consisting of three or more layers including a second deformation prevention layer and a soft magnetic layer.

Alternatively, at least one of the upper shield layer and the lower shield layer is a laminate consisting of three or more layers including an inner soft magnetic layer, second deformation prevention layer and outer soft magnetic layer formed in the order named from the magnetoresistive film side, and the shear modulus of the inner soft magnetic layer is higher than the outer soft magnetic layer.

Alternatively, a first deformation prevention layer having a higher shear modulus than the first ferromagnetic layer and the second ferromagnetic layer is formed between the magnetoresistive film and at least one of the upper shield layer and the lower shield layer, and a second deformation prevention layer is inserted into at least one of the lower shield layer and the upper shield layer.

Since the magnetic head constituted as described above is damaged very little by mechanical polishing when air bearing surface processing is carried out by mechanical polishing to achieve a predetermined sensor height, a magnetoresistive head having high output can be provided at a high yield.

The deformation prevention layer preferably has a shear modulus of $8.5 \times 10^{10}$ Pa or more, and further desirably a Vickers hardness of 250 or more.

The deformation prevention layer is made from a metal selected from the group consisting of Mo, Rh, W and Ir or an alloy containing at least one element selected from the above group.

Alternatively, it is a thin film of a boride, carbide or nitride of at least one element selected from the group consisting of Mo, Rh, W and Ir, or a thin film containing boron, carbon or nitrogen in at least one element selected from the group consisting of Mo, Rh, W and Ir. An element other than Mo, Rh, W and Ir may be contained. By using these materials, corrosion during the production process can be prevented and corrosion resistance under operation environment can be improved.

When either one of the lower shield layer and the upper shield layer is a laminate consisting of three or more layers including a second deformation prevention layer and a soft magnetic layer, the second deformation prevention layer is made from an alloy containing at least one element selected from the group consisting of Fe, Co and Ni and at least one element selected from the group consisting of Mo, Rh, W and Ir, an amorphous alloy containing at least one element selected from the group consisting of Fe, Co and Ni and at least one element selected from the group consisting of Ti, V, Cr, Zr, Nb, Mo, Hf, Ta, Y, Ru, Rh, Pd, Cu, Au, Ag, W, Ir and Pt, or a ceramic material having a higher shear modulus and a higher hardness than a metal material.

By using the above magnetoresistive head having a CPP structure as a read element, a magnetic recording/reproducing system having a linear recording density of 635 kBPI or more can be realized. Also, a magnetic recording/reproducing system having a a real recording density of 60 Gb/in$^2$ or more can be realized.

The magnetic head and the magnetic recording/reproducing system of the present invention will be described in detail with reference to the accompanying drawings.

Embodiment 1

FIG. 1 shows the structure of the air bearing surface of the magnetoresistive head of the present invention. A lower shield layer 11 made from a Ni—Fe alloy and having a predetermined shape is formed on an alumina-titanium carbide substrate coated with an insulator such as alumina, and a lower first deformation prevention layer 13 made from Mo, a lower gap layer 131 made from Ta, a CPP magnetoresistive film 50, an upper gap layer 141 made from Cu and an upper first deformation prevention layer 14 made from Mo are formed on the lower shield layer 11.

The CPP magnetoresistive film 50 consists of a seed layer 15 made from a metal for controlling the orientation of a laminate film formed thereon, for example, 81 at. % Ni-19 at. % Fe, an antiferromagnetic layer 16 made from 52 at. % of Pt and 48 at. % of Mn, a second ferromagnetic layer 17 made from 75 at. % of Co and 25 at. % of Fe, a tunnel barrier layer 18 made from aluminum oxide and a first ferromagnetic layer 19 made from 81 at. % of Ni and 19 at. % of Fe.

After annealing is carried out at 270° C. for 3 hour in a magnetic field while a 3 kOe magnetic field is applied in a sensor height direction to produce an exchange coupling between the antiferromagnetic layer 16 and the second ferromagnetic layer 17, a lift-off mask is formed at a position which becomes a magnetic sensing portion for detecting a magnetic field from a recording medium, and the upper first deformation prevention layer, upper gap layer, CPP magnetoresistive film, lower gap layer and lower first deformation prevention layer excluding the magnetic sensing portion are etched by an ion milling method. An insulating film 21 and a longitudinal biasing layer 20 consisting of a Cr under layer and a CoCrPt hard magnetic film are formed, the lift-off mask is removed, and then an upper shield layer 12 made from a Ni—Fe alloy is formed.

An inductive magnetic head for recording is formed on the upper shield layer 12 through a separation layer for separating a read element portion from a write element portion but the details thereof are omitted herein. After the formation of the inductive magnetic head, annealing is carried out at 250° C. for 3 hours while a 500 Oe magnetic field is applied in the track width direction of the read element, and the magnetization direction of the first ferromagnetic layer 19 is oriented to the track width direction while the magnetization direction of the second ferromagnetic layer 17 is kept substantially in the sensor height direction to complete the wafer processing.

The following air bearing surface processing is carried out next. A wafer is cut into a bar having a plurality of magnetic head elements arranged thereon and lapped by mechanical polishing with lapping equipment until a desired sensor height is obtained. A protection film for protecting a read element and a write element is formed on the air bearing surface, and a predetermined shaped rail is formed into the air bearing surface by an ion milling method or dry etching method to control the spacing (amount of floating) between the magnetic head and the magnetic recording medium. Thereafter, the bar is cut for each element to complete a magnetic head.

For comparison, a magnetic head having no lower first deformation prevention layer 13 and no upper first deformation prevention layer 14 is fabricated.

Figure 2:
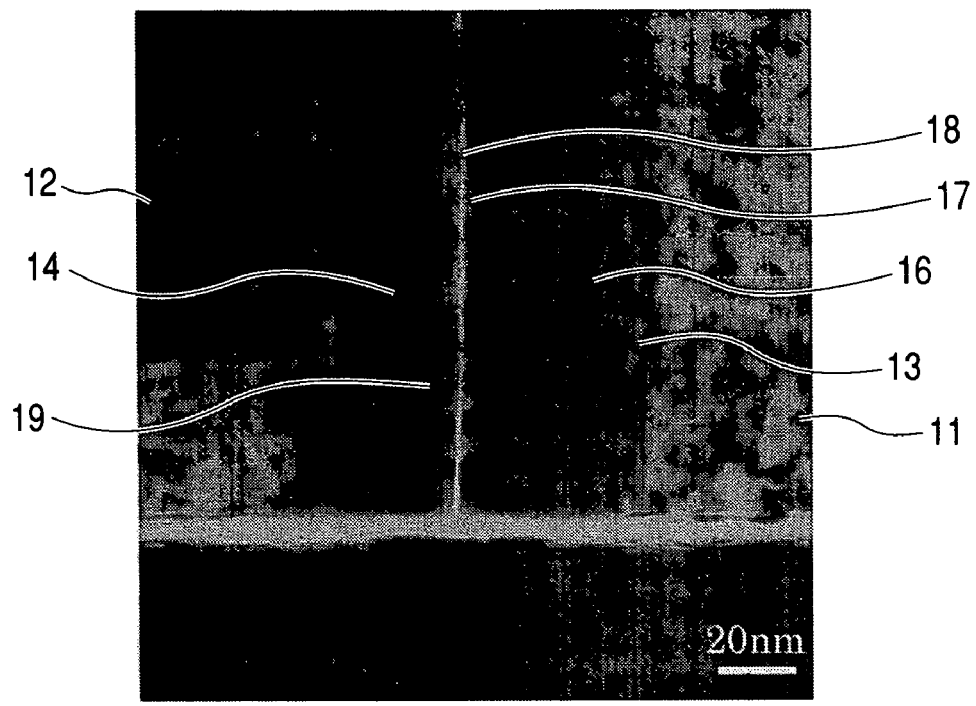
FIG. 2 is a transmission electron photomicrograph of the section in the sensor height direction of a magnetoresistive head according to Embodiment 1 of the present invention.
Figure 3:
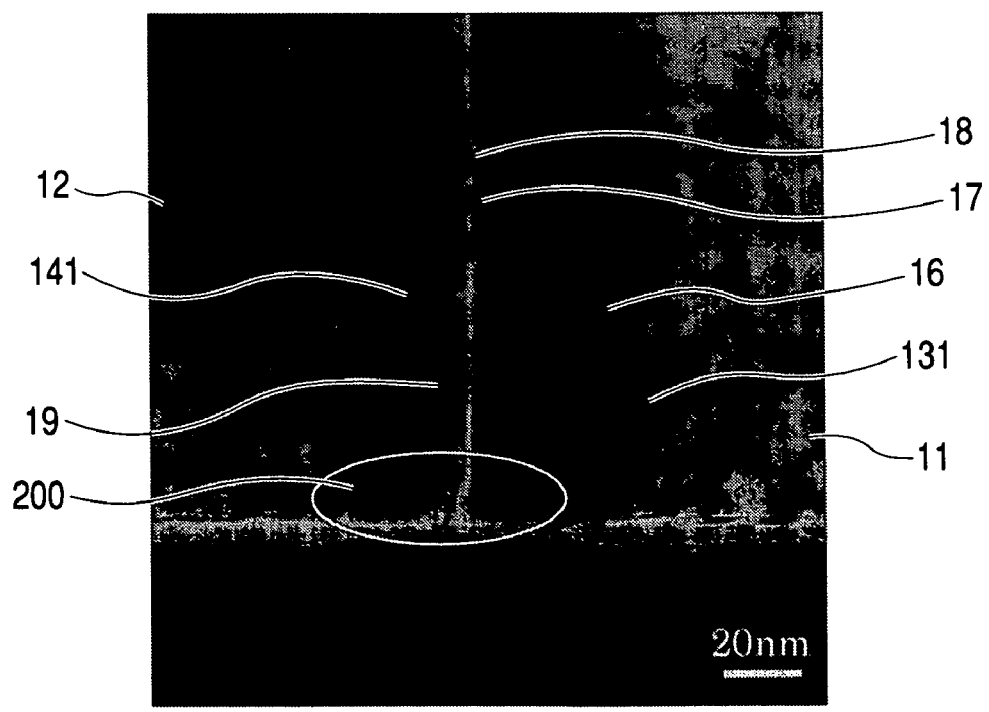
FIG. 3 is a transmission electron photomicrograph of the section in the sensor height direction of a magnetoresistive head having a prior art structure.

FIG. 2 is a cross-sectional transmission electron microscopic image (to be referred to as "cross-sectional TEM image" hereinafter) in the sensor height direction of the magnetoresistive head of this embodiment which comprises a lower first deformation prevention layer 13 made from Mo and an upper first deformation prevention layer 14 made from Mo. FIG. 3 is a TEM image of the section of a head having none of the above layers (Ta used in the gap layer). The air bearing surface is shown in the lower part of the figure. It is seen from FIG. 3 that all the layers from the lower shield layer 11 to the upper shield layer 12 are dragged and deformed in one direction in a portion near the air bearing surface indicated by 200. Meanwhile, the above deformation is not observed in FIG. 2 and an effect obtained by forming the first deformation prevention layers 13 and 14 from a material having a high shear modulus is marked.

TABLE 1

| | Properties of wafer | | Testing results of head (average value) | | |
|---|---|---|---|---|---|
| | Resistance area product (Ωμm$^2$) | MR ratio (%) | Number of tested heads | Head resistance (Ω) | Read output (mV p—p) |
| Present invention | 5.2 | 14.0 | 93 | 225 | 2.7 |
| Comparative example (prior art) | 5.5 | 15.1 | 88 | 57 | 0.5 |

The above Table 1 shows the results obtained by evaluating the head resistance and reproduction output of heads having a track width of 0.18 μm and a sensor height of 0.13 μm. The head of the present invention had a head resistance and output estimated from the magnetoresistive properties of a wafer whereas the head of comparative example had a small head resistance and a low output. It is considered that the reason for this is the great deterioration of magnetoresistive properties by the deformation of an element near the air bearing surface, particularly, the deformation of the tunnel barrier layer 18 as shown in FIG. 2 and FIG. 3.

In this embodiment, both the lower first deformation prevention layer 13 and the upper first deformation prevention layer 14 are made from Mo. Even when either one of the lower first deformation prevention layer 13 and the upper first deformation prevention layer 14 is made from Mo, the effect of suppressing the deformation of a portion near the air bearing surface which occurs at the time of air bearing surface processing is obtained.

The material used in the lower first deformation prevention layer 13 and the upper first deformation prevention layer 14 must have a high shear modulus in order to prevent deformation at the time of air bearing surface processing as well as a low resistivity as they are part of an electrode for supplying a sensing current.

TABLE 2

| Material | | Shear modulus G(×10$^{10}$ Pa) | Resistivity (×10$^{-8}$ Ω · m) |
|---|---|---|---|
| Used in CPP-structure magnetoresistive sensor film | 81at. % Ni-19at. % Fe | 7.8 | 7.6 |
| | 90at. %-Co-10at. % Fe | 8.3 | 6.8 |
| | 75at. % Co-25at. % Fe | 8.4 | 7.3 |
| | 50at. % Co-50at. % Fe | 8.5 | 7.6 |
| | Ta | 6.9 | 180 |
| Deformation prevention layer material | Mo | 16.7 | 5.5 |
| | Rh | 17.1 | 4.7 |
| | W | 14.2 | 5.4 |
| | Ir | 12.3 | 5.1 |

Table 2 above shows the shear modulus G of materials used in the CPP magnetoresistive film and typical materials for the lower first deformation prevention layer 13 and the upper first deformation prevention layer 14.

The term "shear modulus G" as used herein means a physical value of a material showing the degree of shearing deformation represented by the equation $\sigma = G \cdot \phi$ when shearing stress is represented by $\sigma$ and strain angle is represented by $\phi$. As the shear modulus G increases, the amount of deformation becomes smaller.

It is understood from Table 2 that the magnetic materials used in the lower shield layer 11, upper shield layer 12, first ferromagnetic layer 19 and second ferromagnetic layer 17 have a shear modulus of 7.8 to 8.5×10$^{10}$ Pa. A material having at least a higher shear modulus than these layers must be used. The shear modulus G of Ta used in the head manufactured for comparison is 6.2×10$^{10}$ Pa which falls below the above range whereas the shear modulus G of Mo used in this embodiment is 16.7×10$^{10}$ Pa which is more than double the above value. Metals having a high shear modulus G other than Mo are Rh, W, and Ir as shown in Table 2.

Since these materials have a resistivity ρ of 5 to 6×10$^{-8}$ Ω·m as shown in Table 2, even when they constitute part of an electrode, it can be judged that they have no influence on using for a part of the electrode. Therefore, Rh, W, Ir or an alloy containing at least one of these elements may be used in the lower first deformation prevention layer 13 or the upper first deformation prevention layer 14 besides Mo.

As for the alloy, since Mo, Rh, W and Ir have low resistivity, the composition of the alloy is not limited by resistivity but limited by a condition that its shear modulus must be 8.5×10$^{10}$ Pa or more.

For example, Ta alloys may contain 17 at. % or more of Mo, 16 at. % or more of Rh, 22 at. % or more of W and 30 at. % or more of Ir.

Cu alloys may contain 32 at. % or more of Mo, 31 at. % or more of Rh, 41 at. % or more of W and 51 at. % or more of Ir.

Besides alloys, a thin film of a boride, carbide or nitride of at least one element selected from Mo, Rh, W and Ir, or a thin film containing a boron, carbon or nitrogen in at least one element selected from Mo, Rh, W and Ir may be used. An element other than Mo, Rh, W and Ir may be contained. By using these materials, corrosion during the production process can be prevented and corrosion resistance under operation environment can be improved.

There is the following relationship between the deformation prevention layer and the length of a read gap. The effect of preventing deformation is large when the deformation prevention layer is thick. When the length of the read gap is 60 nm at which a magnetoresistive head having a CPP structure becomes practically usable, the upper limit of thickness of the deformation prevention layer is 45 nm which is obtained by subtracting the minimum film thickness 15 nm of the CPP magnetoresistive film 50 from the length of the read gap. The ratio of the thickness of the deformation prevention layer to the length of the read gap is 0.75 which is the upper limit of ratio of the thickness of the deformation prevention layer to the length of the read gap. When the ratio of the thickness of the deformation prevention layer to the length of the read gap is larger than 0.75, the reproduction output may lower.

The minimum film thickness of the deformation prevention layer is about a 3-atom layer, that is, about 0.33 nm when the deformation prevention layer is ideally deposited to exhibit its function. In this case, the ratio of the thickness of the deformation prevention layer to the length of the read gap is 0.005. This is the lower limit of ratio of the thickness of the deformation prevention layer to the length of the read gap. That is, when the ratio of the thickness of the deformation prevention layer to the length of the read gap is smaller than 0.005, the deformation prevention layer may not be able to fulfill its function completely.

When the length of the read gap is smaller than 60 nm, the upper limit value becomes smaller than 0.75 and the lower limit value becomes larger than 0.005. As a result, the ratio of the thickness of the deformation prevention layer to the length of the read gap becomes 0.005 to 0.75.

The materials constituting the lower shield layer 11, upper shield layer 12 and CPP magnetoresistive film 50 described in this embodiment are specific examples in the present invention. Even when other materials having the same functions are used, the effect of the present invention is not changed.

Further, in this embodiment, deformation prevention layers 13 and 14 are formed respectively between the lower shield layer 11 and the lower gap layer 131 and between the upper gap layer 141 and the upper shield layer 12 as shown in FIG. 1. A deformation prevention layer may be formed only between the lower gap layer 131 and the CPP magnetoresistive film 50 or between the CPP magnetoresistive film 50 and the upper gap layer 141. Further, as shown in FIG. 4, the lower gap layer and the upper gap layer may serve as a deformation prevention layer.

As for the above ratio of the thickness of the deformation prevention layer to the length of the read gap, whether the number of the deformation prevention layers formed is one or two, the ratio of the total thickness of the deformation layer(s) to the length of the read gap is preferably in the range of 0.005 to 0.75.

Embodiment 2

In Embodiment 1, the lower first deformation prevention layer 13 and the upper first deformation prevention layer 14 have substantially the same width in the track direction as the CPP magnetoresistive film 50. In this embodiment shown in FIG. 5, they have a larger width than the CPP magnetoresistive film 50. The lower first deformation prevention layer 13 can be made as wide as the lower shield layer 11 and the upper first deformation prevention layer 14 can be made as wide as the upper shield layer 12.

One example of the production process is as follows. After the lower shield layer 11 is formed, the lower first deformation prevention layer 13 is formed and patterned to a desired shape by a dry etching method or ion milling method. The CPP magnetoresistive film 50 is formed, a lift-off mask is formed at a position which becomes a magnetic sensing portion, and the upper gap layer and the CPP magnetoresistive film excluding the magnetic sensing portion are etched by the ion milling method. After the lift-off mask is removed, the upper first deformation prevention layer 14 and the upper shield layer 12 are formed. A predetermined resist pattern is formed on these, and the upper first deformation prevention layer 14 and the upper shield layer 12 are made the same form using the above resist pattern as a mask. Subsequent steps after this are the same as those in Embodiment 1.

By forming a layer made from a material having a high shear modulus to be wide in the track width direction, deformation near the air bearing surface can be suppressed, thereby increasing the process margin of the air bearing surface processing.

Embodiment 3

In the structure of Embodiment 2 (FIG. 5), in order to reduce contact resistance between the lower first deformation prevention layer 13 and the shield layer 15 and between the first ferromagnetic layer 19 and the upper first deformation prevention layer 14, the surfaces of the lower first deformation prevention layer 13 and the first ferromagnetic layer 19 must be cleaned by sputter etching or the like. This cleaning varies the thickness of the lower first deformation prevention layer 13 and the thickness of the first ferromagnetic layer 19, whereby the distance between the lower shield layer and the upper shield layer (to be herein referred to as a "shield to shield distance") changes in the former case and read sensitivity and the asymmetry of the output wavelength vary in the latter case.

Figure 6:
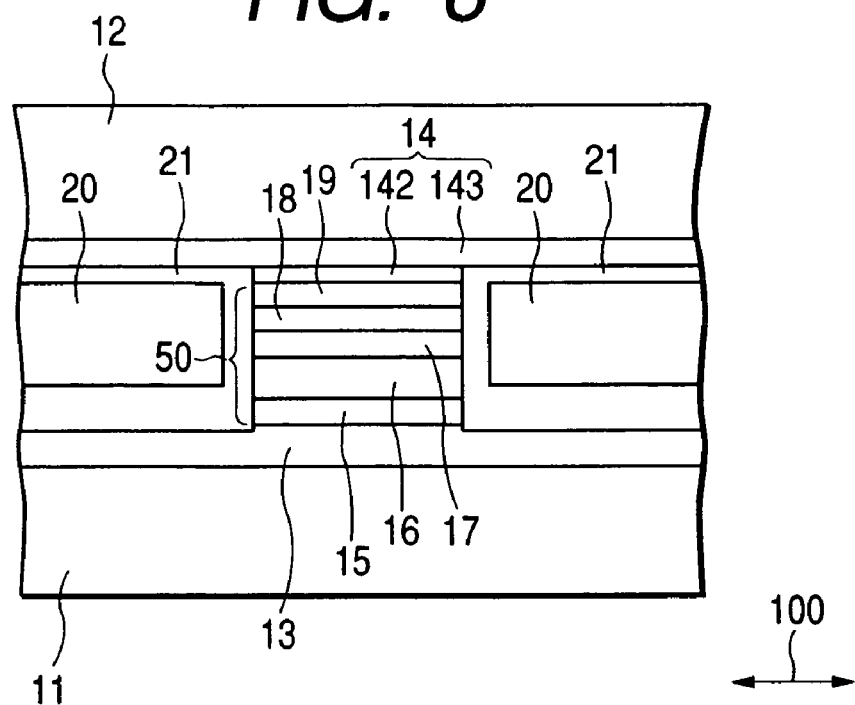
FIG. 6 is a diagram showing the structure of the air bearing surface of a magnetoresistive head having a CPP structure according to Embodiment 3 of the present invention.

FIG. 6 shows the structure capable of reducing changes in properties caused by cleaning. After the lower shield layer 11 is formed and its surface is cleaned by sputter etching or the like, the lower first deformation prevention layer 13, CPP magnetoresistive film 50 consisting of a seed layer 15, antiferromagnetic layer 16, second ferromagnetic layer 17, tunnel barrier layer 18 and first ferromagnetic layer 19, and the lower part 142 of the upper first deformation prevention layer are formed. A lift-off mask is formed at a position which becomes a magnetic sensing portion, and the upper gap layer and the CPP magnetoresistive film excluding the magnetic sensing portion are etched by ion milling method, leaving the lower first deformation prevention layer 13. After the lift-off mask is removed, the surface is cleaned, and the upper portion 143 of the upper first deformation prevention layer and the upper shield layer 12 are formed. Subsequent steps after this are the same as in Embodiment 1.

In this embodiment, the first deformation prevention layer 13 remains when etching is carried out to form the magnetic sensing portion. When the first ferromagnetic layer 19 at least is removed by etching, the effect of suppressing deformation near the air bearing surface and the properties of the head will not change even if etching is stopped at any position below the first ferromagnetic layer 19.

Embodiment 4

Figure 7:
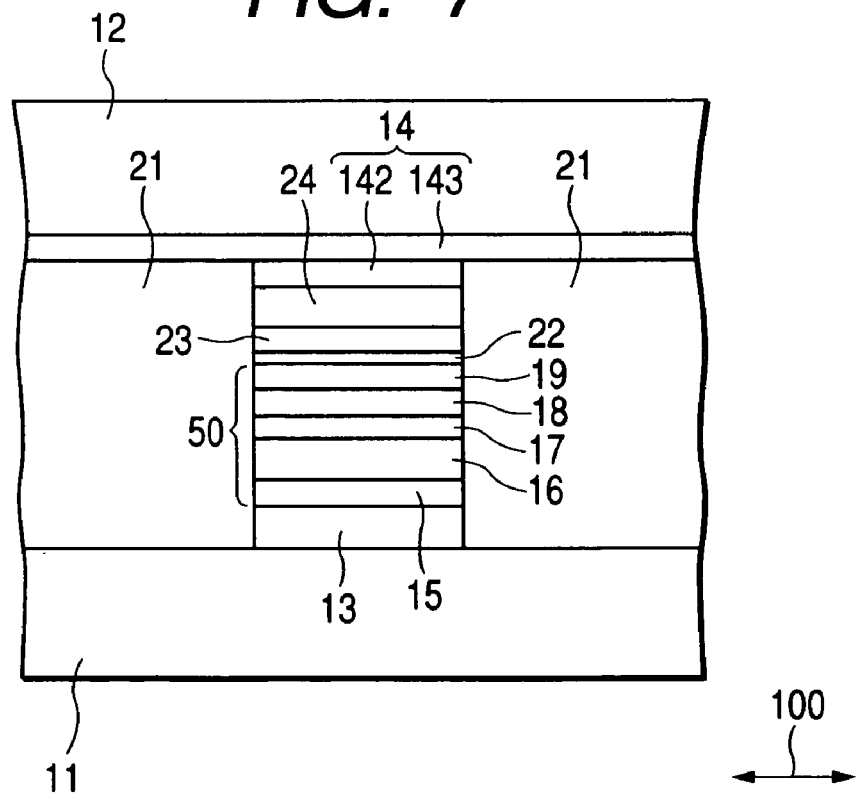
FIG. 7 is a diagram showing the structure of the air bearing surface of a magnetoresistive head having a CPP structure according to Embodiment 4 of the present invention.

FIG. 7 shows the structure of the air bearing surface in an embodiment having another longitudinal biasing method of the present invention. After, the lower first deformation prevention layer 13 and CPP magnetoresistive film 50 consisting of a seed layer 15, antiferromagnetic layer 16, second ferromagnetic layer 17, tunnel barrier layer 18 and first ferromagnetic layer 19 are formed on the lower shield layer 11, an underlayer of longitudinal biasing layer 22 made from Cu, Ta or Ru, or a laminate consisting of these layers, longitudinal biasing soft magnetic layer 23 made from a Ni—Fe alloy, Co—Fe alloy, Fe or a laminate film consisting of these layers, a pinning layer for longitudinal biasing 24 consisting of a Mn—Ir-based antiferromagnetic layer or CoCrPt-based hard magnetic layer, and the lower portion 142 of the upper first deformation prevention layer are formed. A lift-off mask is formed at a position which becomes a magnetic sensing portion and etching is carried out by the ion milling method to form an insulating film 21. Subsequent steps after the removal of the lift-off mask are the same as in Embodiment 3.

In this embodiment, the layer formed on both sides of the magnetic sensing portion is only the insulating film 21, thereby simplifying the fabrication process.

Embodiment 5

Figure 8:
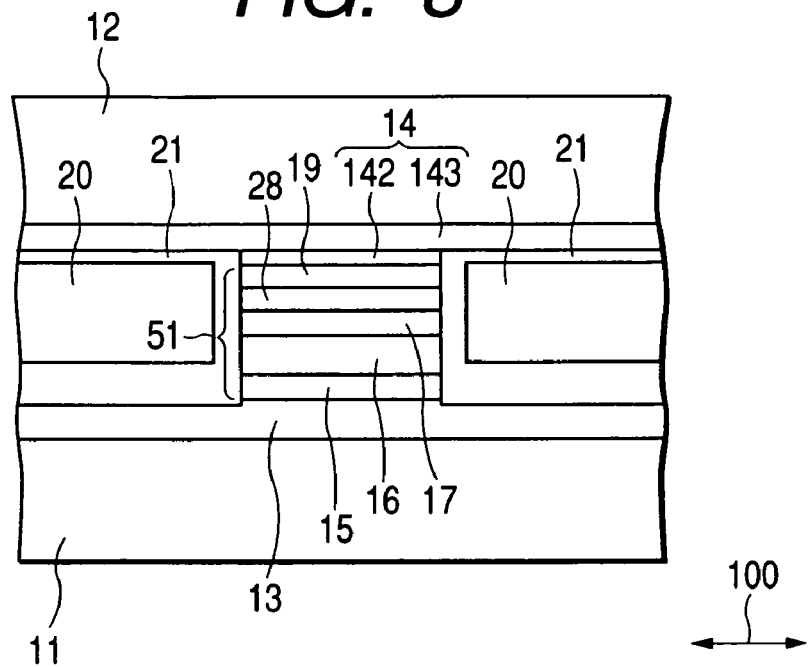
FIG. 8 is a diagram showing the structure of the air bearing surface of a magnetoresistive head having a CPP structure according to Embodiment 5 of the present invention.

FIG. 8 shows the structure of the air bearing surface of an embodiment having another CPP magnetoresistive film of the present invention. The structure of the whole element is the same as that of Embodiment 3 (FIG. 6) except that the CPP magnetoresistive film 51 is a so-called CPP-GMR film consisting of a seed layer 15, antiferromagnetic layer 16, second ferromagnetic layer 17, conductive layer 28 and first ferromagnetic layer 19. The seed layer 15, antiferromagnetic layer 16, second ferromagnetic layer 17 and first ferromagnetic layer 19 may be used as the same materials mentioned in Embodiment 1, respectively. The conductive layer 28 may be made from Au, Cu or Pt.

When a so-called half metal such as magnetite is used in the second ferromagnetic layer 17 or the conductive layer 28 side of the first ferromagnetic layer 19, the magnetoresistance ratio can be improved. In this case, titanium nitride or titanium oxide may be used besides the above material of the conductive layer 28.

In this embodiment, the CPP magnetoresistive film 50 having a tunnel magneto-resistance effect in Embodiment 3 is replaced by the CPP magnetoresistive film 51 having a CPP-GMR effect. The CPP magnetoresistive film 50 in Embodiment 1, 2 or 4 may be replaced by the CPP magnetoresistive film 51 having a CPP-GMR effect.

Embodiment 6

Figure 9:
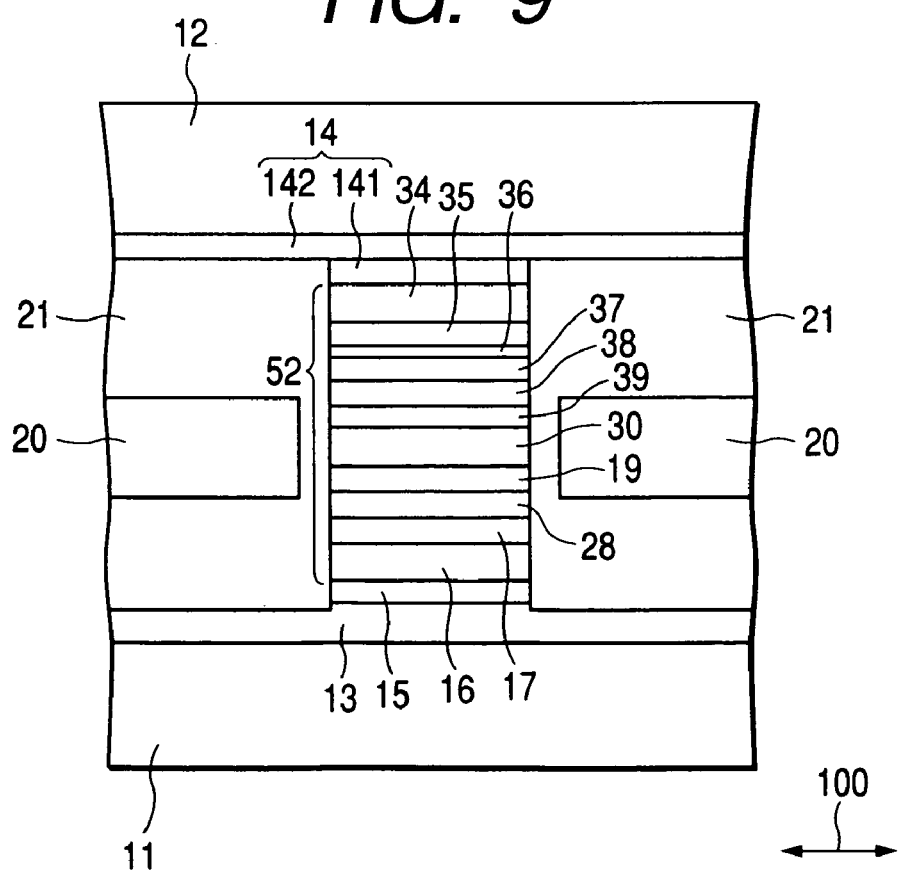
FIG. 9 is a diagram showing the structure of the air bearing surface of a magnetoresistive head having a CPP structure according to Embodiment 6 of the present invention.

FIG. 9 shows that another CPP magnetoresistive film 52 having a CPP-GMR effect is used in place of the CPP magnetoresistive film 51 in Embodiment 5 (FIG. 8). More specifically, a seed layer 15, first antiferromagnetic layer 16, second ferromagnetic layer 17, first conductive layer 28, first ferromagnetic layer 19, separation layer 30, third ferromagnetic layer 39, second conductive layer 38, fourth ferromagnetic layer 37, interlayer coupling layer 36, fifth ferromagnetic layer 35 and second antiferromagnetic layer 34 are formed on the substrate in the order named. The fourth ferromagnetic layer 37 and the fifth ferromagnetic layer 35 are antiferromagnetically coupled together by the interlayer coupling layer 36. When an external magnetic field is not applied, film structure and annealing conditions are set to ensure that the magnetization direction of the second ferromagnetic layer 17 becomes opposite to the magnetization direction of the fourth ferromagnetic layer 37.

When the CPP magnetoresistive film 52 having the above structure is used, a single-peak waveform is obtained for reproducing a perpendicular recording medium, thereby making it possible to use signal processing system for the longitudinal recording which has been used conventionally.

Embodiment 7

The above embodiments concern the gap layers, but this embodiment and the following embodiments concern the shield layers.

Figure 10:
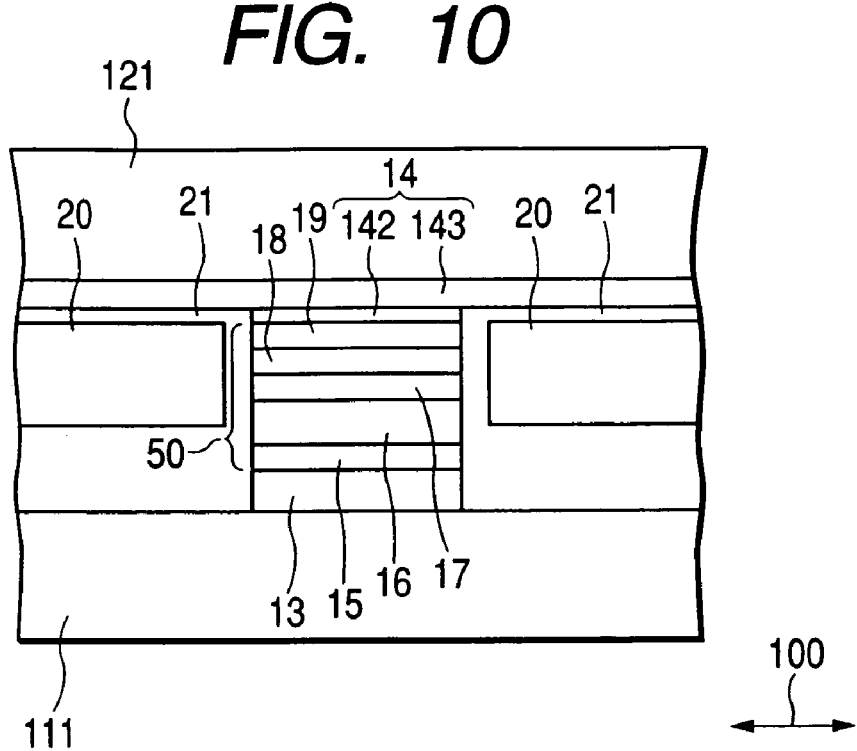
FIG. 10 is a diagram showing the structure of the air bearing surface of a magnetoresistive head having a CPP structure according to Embodiment 7 of the present invention.

FIG. 10 shows the structure of the air bearing surface of another embodiment of the present invention. The lower shield layer 111 and the upper shield layer 121 are made from a Ni—Fe—Mo alloy having a high shear modulus obtained by adding Mo to a Ni—Fe alloy. This can prevent deformation near the air bearing surface.

Besides the Ni—Fe—Mo alloy, alloys obtained by adding Mo, Rh, W or Ir to a Ni—Fe alloy, a Co—Ni—Fe alloy or Fe—Co alloy may also be used.

When the lower first deformation prevention layer 13 and the upper first deformation prevention layer 14 having a high shear modulus described in Embodiment 1 are used in combination, the process margin of air bearing surface processing can be made wider.

Embodiment 8

Figure 11:
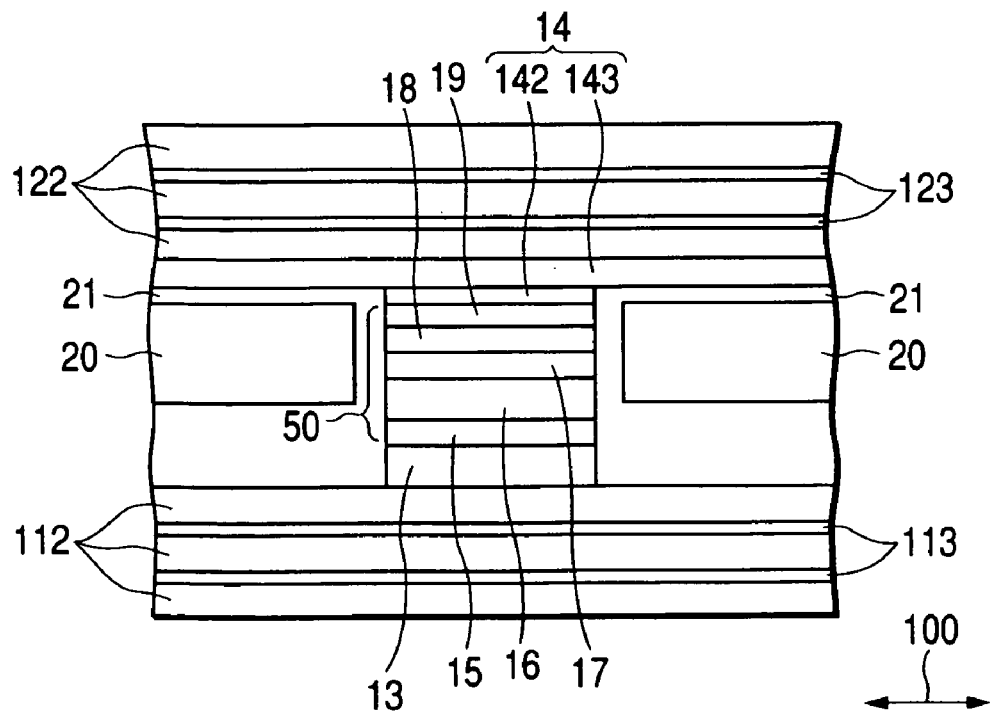
FIG. 11 is a diagram showing the structure of the air bearing surface of a magnetoresistive head having a CPP structure according to Embodiment 8 of the present invention.

FIG. 11 shows the structure of the air bearing surface of an embodiment having another shield layer structure of the present invention. The lower shield layer is a multi-layered structure consisting of soft magnetic layers 112 made from a Ni—Fe alloy and second deformation prevention layers 113 made from Mo which is a material having a high shear modulus, and the upper shield layer is a multi-layered structure consisting of soft magnetic layers 122 made from a Ni—Fe alloy and second deformation prevention layers 123 made from Mo which is a material having a high shear modulus.

The soft magnetic layers 112 and 122 may be made from a Co—Ni—Fe alloy or Fe—Co alloy besides the Ni—Fe alloy, and the second deformation prevention layers 113 and 123 may be made from Rh, W, Ir or an alloy containing at least one of these elements besides Mo.

When the lower first deformation prevention layer 13 and the upper first deformation prevention layer 14 having a high shear modulus are used in combination in this embodiment like Embodiment 7, the process margin of air bearing surface processing can be made wider.

FIG. 11 shows that the lower shield layer and the upper shield layer are each a five-layered structure consisting of soft magnetic layers and second formation prevention layers. This is a specific example of this embodiment and may be a three-layered structure, or a laminate structure consisting of a larger number of layers or an even number of layers.

Embodiment 9

Figure 12:
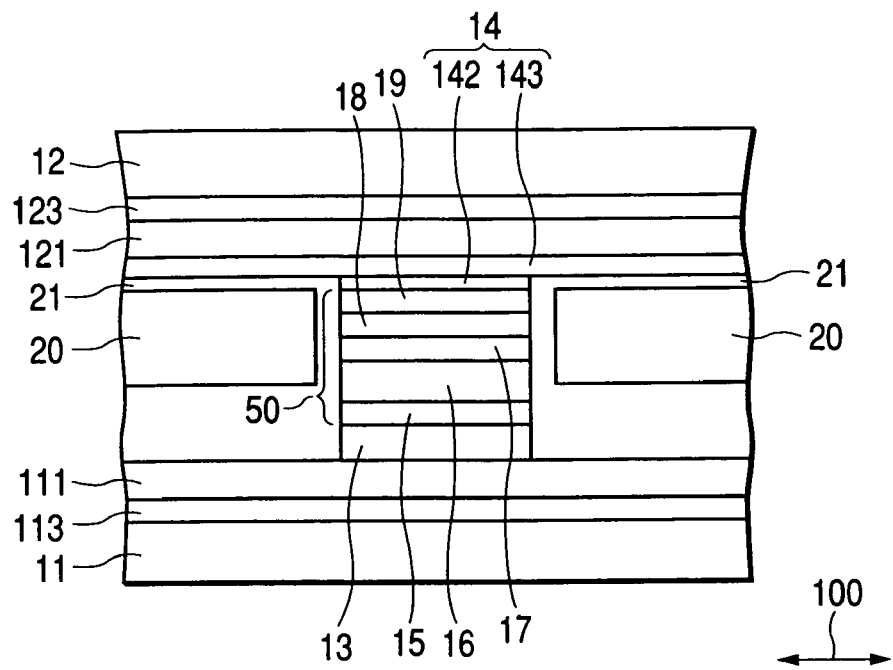
FIG. 12 is a diagram showing the structure of the air bearing surface of a magnetoresistive head having a CPP structure according to Embodiment 9 of the present invention.

A single shield layer is used in Embodiment 7. As shown in FIG. 12, the lower shield layer is made a laminate structure consisting of a lower shield layer 11 made from a commonly used material such as a Ni—Fe alloy and formed on the substrate side, a second deformation prevention layer 113 made from Mo which is a material having a high shear modulus and a lower shield layer 111 having high rigidity which is made from a material having a high shear modulus such as a Ni—Fe—Mo alloy and formed near the lower gap layer 13, and the upper shield layer is also made a laminate structure consisting of an upper shield layer 121 having high rigidity and formed near the upper gap layer 14, a second deformation prevention layer 123 made from Mo which is a material having a high shear modulus and formed on the above upper shield layer 121 and an upper shield layer 12 made from a commonly used material such as a Ni—Fe alloy.

When the lower first deformation prevention layer 13 and the upper first deformation prevention layer 14 having a high shear modulus are used in combination in this embodiment like Embodiment 7, the effect of preventing deformation and suppressing the deterioration of read performance increases.

In FIG. 12, the shield layer is a three-layered structure consisting of a shield layer having high rigidity, a second deformation prevention layer and a shield layer. Even when the shield layer is a two-layered structure consisting of a shield layer having high rigidity and a shield layer without a second deformation prevention layer, deformation can be prevented as the rigidity of the shield layer on the CPP magnetoresistive film 50 side is high. When the shield layer is a multi-layered structure consisting of three or more layers, the same or larger effect than the above effect can be obtained.

The second deformation prevention layers 113 and 123 may be made from Rh, W, Ir or an alloy containing at least one of these elements besides Mo. The shield layers 111 and 121 having high rigidity may be made from an alloy containing at least one element selected from the group consisting of Fe, Co and Ni and at least one element selected from the group consisting of Mo, Rh, W and Ir, or an amorphous alloy containing at least one element selected from the group consisting of Fe, Co and Ni and at least one element selected from the group consisting of Ti, V, Cr, Zr, Nb, Mo, Hf, Ta, Y, Ru, Rh, Pd, Cu, Au, Ag, W, Ir and Pt.

Embodiment 10

Figure 13:
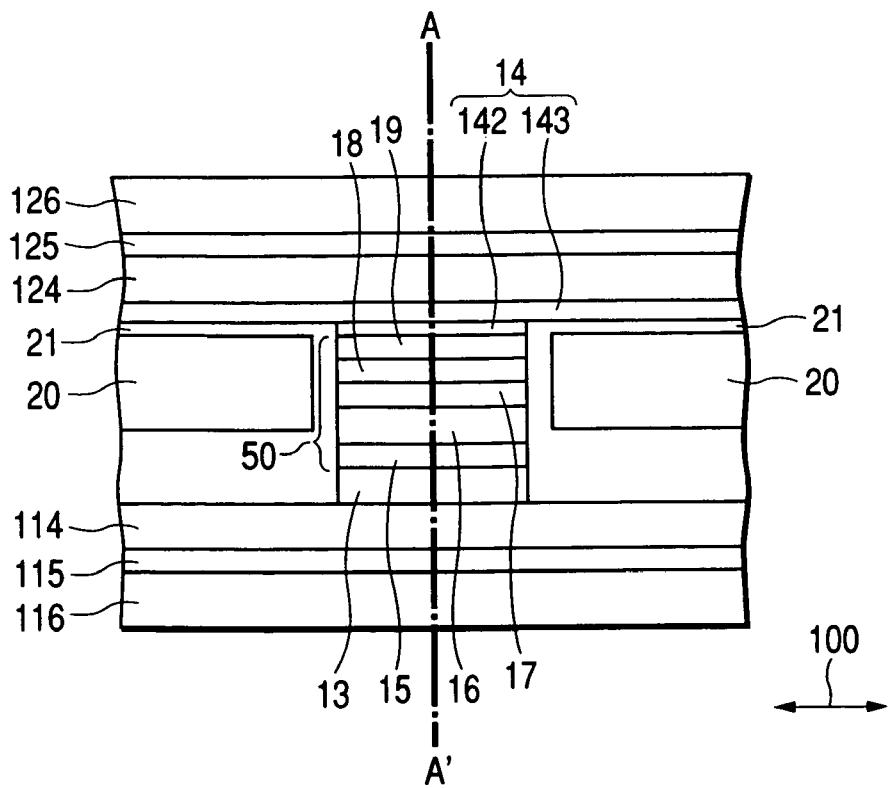
FIG. 13 is a diagram showing the structure of the air bearing surface of a magnetoresistive head having a CPP structure according to Embodiment 10 of the present invention.

FIG. 13 shows the structure of the air bearing surface of an embodiment having another shield layer structure of the present invention. Ceramic layers 115 and 125 having higher rigidity than metal are formed in part of the shield layer to minimize deformation at the time of air bearing surface processing. The ceramic layers may be made from aluminum oxide, silicon oxide, titanium oxide, zirconium oxide, hafnium oxide, tantalum oxide, aluminum nitride, silicon nitride, titanium nitride, zirconium nitride, hafnium nitride, tantalum nitride, diamond carbon (including diamond-like carbon), silicon carbide, titanium carbide, zirconium carbide, hafnium carbide, tantalum carbide or tungsten carbide. When aluminum oxide, aluminum nitride, silicon nitride, diamond carbon and silicon carbide having high rigidity are used out of these, a large effect is obtained.

Figure 14:
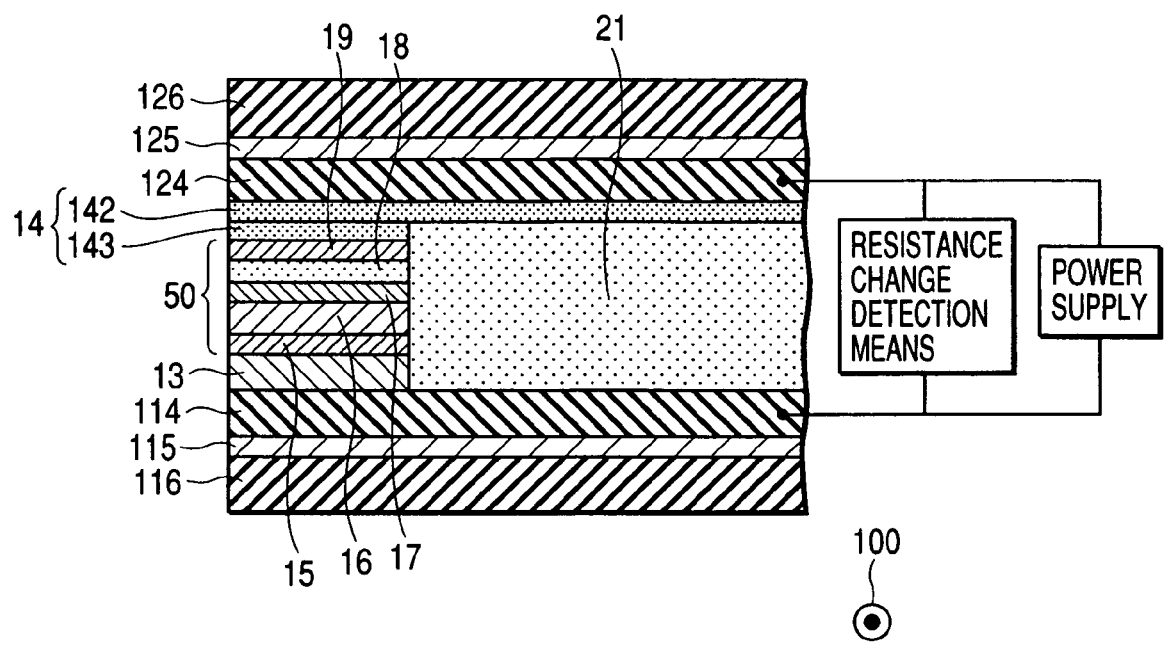
FIG. 14 is a diagram showing the structure of the section in the sensor height direction of the magnetoresistive head having a CPP structure of Embodiment 10 of the present invention.
Figure 15:
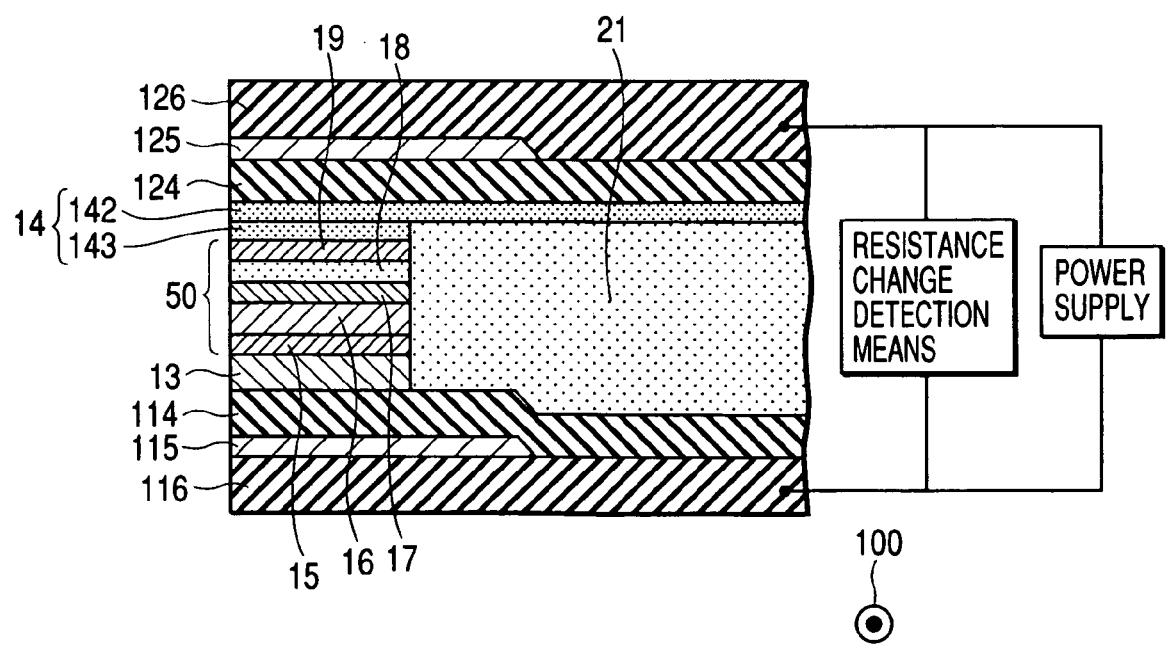
FIG. 15 is a diagram showing the structure of the section in the sensor height direction of another magnetoresistive head having a CPP structure of Embodiment 10 of the present invention.

In this case, the arrangement of electrodes must be taken account of according to the configuration of the ceramic layers. FIG. 14 and FIG. 15 are sectional views in the sensor height direction cut on A–A' of the CPP magnetoresistive film 50 of FIG. 13. FIG. 14 shows that the ceramic layers are formed the same size as the shield layers. In this case, as the resistance of the ceramic layers is high, the first lower shield layer 114 and the first upper shield layer 124 near the CPP magnetoresistive film 50 are used as electrodes. FIG. 15 shows that ceramic layers are formed only on the element end sides of the shield layers. In this case, as the two shield layers formed through the ceramic layers are electrically connected to each other, the second lower shield layer 116 and the second upper shield layer 126 away from the CPP magnetoresistive film 50 can be used as electrodes, too.

In FIGS. 9 to 14, the lower first deformation prevention layer 13 and the upper first deformation prevention layer 14 are formed. However, to adjust the shield to shield distance, the lower gap layer 131 or the upper gap layer 141 may be formed.

In the above embodiments, the effect of the present invention does not change even when the CPP magnetoresistive film 50 having a tunnel magneto-resistance effect is replaced by the CPP magnetoresistive film 51 having a CPP-GMR effect. When the second ferromagnetic layer 17 is made a laminate structure consisting of two ferromagnetic layers coupled antiferromagnetically through Ru or Ir to improve the asymmetry of an output waveform, or when the first ferromagnetic layer 19 is made a laminate structure consisting of two ferromagnetic layers coupled antiferromagnetically through Ru or Ir to improve read sensitivity, the effect of the present invention does not change.

In the above embodiments, the intermediate layer may be a tunnel barrier layer or a conductive layer, the magnetization direction of the second ferromagnetic layer may be fixed to a specific direction, and the magnetic head may be provided with a write element for recording the information on a magnetic recording medium.

According to the present invention, the magnetic head is characterized in that the intermediate layer is a tunnel barrier layer.

According to the present invention, the magnetic head is characterized in that the intermediate layer is a conductive layer.

According to the present invention, the magnetic head is characterized in that the magnetization direction of the second ferromagnetic layer is fixed to a specific direction.

According to the present invention, the magnetic head further has a write element for recording information on the magnetic recording medium.

According to the present invention, a magnetic recording/reproducing system comprises a magnetic recording medium for recording information, a magnetic head having a write element for recording information on the magnetic recording medium and a read element for detecting information recorded on the magnetic recording medium, a read/write circuit for transmitting and receiving a recording signal and a reproducing signal to and from the magnetic head, actuator means for moving the magnetic head to a predetermined position on the magnetic recording medium, and recording/reproduction operation control means for controlling the read/write circuit and the actuator means, wherein the magnetic head is the magnetic head of any one of the aspect of the invention.

According to the present invention, the magnetic recording/reproducing system has a linear recording density of 635 kBPI or more.

According to the present invention, the magnetic recording/reproducing system has a plane recording density of 60 Gb/in$^2$ or more.

As obvious from the above description, according to the present invention, it is possible to provide a magnetoresistive head having high output and comprising a CPP magnetoresistive film having a tunnel magnetoresistive or CPP-GMR effect at a high yield because deformation near the air bearing surface which occurs when air bearing surface processing for obtaining a predetermined sensor height is carried out by mechanical polishing can be reduced or prevented (1) by forming a deformation prevention layer having a higher shear modulus than the first ferromagnetic layer and the second ferromagnetic layer between the above magnetoresistive film and at least one of the upper shield layer and the lower shield layer or (2) by making at least one of the upper shield layer and the lower shield layer a laminate consisting of three or more layers including a second deformation prevention layer and a soft magnetic layer.

What is claimed is:

1. A magnetic head comprising a lower shield layer, an upper shield layer, a magnetoresistive film formed between the upper shield layer and the lower shield layer and comprising at least a first ferromagnetic layer, intermediate layer and second ferromagnetic layer, a lower gap layer formed between the lower shield layer and the magnetoresistive film, and an upper gap layer formed between the upper shield layer and the magnetoresistive film, and having detection means for detecting a resistance change produced from the magnetoresistive film by a variation in external magnetic field when a sensing current is applied in a direction substantially perpendicular to the interface between the first ferromagnetic layer and the intermediate layer and the interface between the intermediate layer and the second ferromagnetic layer, wherein at least one of the upper shield layer and the lower shield layer is a laminate consisting of three or more layers including a deformation prevention layer and a soft magnetic layer.

2. The magnetic head of claim 1, wherein the shear modulus of the deformation prevention layer is $8.5 \times 10^{10}$ Pa or more.

3. The magnetic head of claim 1, wherein the Vickers hardness of the deformation prevention layer is 250 or more.

4. The magnetic head of claim 1, wherein the deformation prevention layer is made from at least one metal selected from the group consisting of Mo, Rh, W and Ir or an alloy containing at least one element selected from the above group.

5. The magnetic head of claim 1, wherein the deformation prevention layer contains at least one element selected from the group consisting of Mo, Rh, W and Ir and at least one element selected from the group consisting of B, C and N.

6. The magnetic head of claim 1, wherein the deformation prevention layer is made from a ceramic material.

7. The magnetic head of claim 6, wherein the ceramic material is at least one member selected from the group consisting of aluminum oxide, silicon oxide, titanium oxide, zirconium oxide, hafnium oxide, tantalum oxide, aluminum nitride, silicon nitride, titanium nitride, zirconium nitride, hafnium nitride, tantalum nitride, diamond carbon, diamond-like carbon, silicon carbide, titanium carbide, zirconium carbide, hafnium carbide, tantalum carbide and tungsten carbide.

8. A magnetic head comprising a lower shield layer, an upper shield layer, a magnetoresistive film formed between the upper shield layer and the lower shield layer and comprising at least a first ferromagnetic layer, intermediate layer and second ferromagnetic layer, a lower gap layer formed between the lower shield layer and the magnetoresistive film, and an upper gap layer formed between the upper shield layer and the magnetoresistive film, and having detection means for detecting a resistance change produced from the magnetoresistive film by a variation in external magnetic field when a sensing current is applied in a direction substantially perpendicular to the interface between the first ferromagnetic layer and the intermediate layer and the interface between the intermediate layer and the second ferromagnetic layer, wherein at least one of the upper shield layer and the lower shield layer is a laminate consisting of three or more layers including an inner soft magnetic layer, a deformation prevention layer and an outer soft magnetic layer formed in the mentioned order from the magnetoresistive film side, and the shear modulus of the inner soft magnetic layer is higher than the outer soft magnetic layer.

9. The magnetic head of claim 8, wherein the shear modulus of the deformation prevention layer is $8.5 \times 10^{10}$ Pa or more.

10. The magnetic head of claim 8 wherein the Vickers hardness of the deformation prevention layer is 250 or more.

11. The magnetic head of claim 8 wherein the deformation prevention layer is made from at least one metal selected from the group consisting of Mo, Rh, W and Ir or an alloy containing at least one element selected from the above group.

12. The magnetic head of claim 8, wherein the deformation prevention layer contains at least one element selected from the group consisting of Mo, Rh, W and Ir and at least one element selected from the group consisting of B, C and N.

13. The magnetic head of claim 8, wherein the deformation prevention layer is made from a ceramic material.

14. The magnetic head of claim 13, wherein the ceramic material is at least one member selected from the group consisting of aluminum oxide, silicon oxide, titanium oxide, zirconium oxide, hafnium oxide, tantalum oxide, aluminum nitride, silicon nitride, titanium nitride, zirconium nitride, hafnium nitride, tantalum nitride, diamond carbon, diamond-like carbon, silicon carbide, titanium carbide, zirconium carbide, hafnium carbide, tantalum carbide and tungsten carbide.

15. The magnetic head of claim 8, wherein the inner soft magnetic layer is made from an alloy containing at least one element selected from the group consisting of Fe, Co and Ni and at least one element selected from the group consisting of Mo, Rh, W and Ir.

16. The magnetic head of claim 8, wherein the inner soft magnetic layer is made from an amorphous alloy containing at least one element selected from the group consisting of Fe, Co and Ni and at least one element selected from the group consisting of Ti, V, Cr, Zr, Nb, Mo, Hf, Ta, Y, Ru, Rh, Pd, Cu, Au, Ag, W, Ir and Pt.

* * * * *